Sept. 17, 1963  P. E. EICHELBERGER  3,103,808
PORTABLE EQUIPMENT CHECK UNITS
Filed Sept. 30, 1960  3 Sheets-Sheet 1

INVENTOR
PAUL E. EICHELBERGER

BY *Shephard Cawfull*

ATTORNEY

Sept. 17, 1963    P. E. EICHELBERGER    3,103,808
PORTABLE EQUIPMENT CHECK UNITS
Filed Sept. 30, 1960    3 Sheets-Sheet 3

INVENTOR
PAUL E. EICHELBERGER

BY *Shepherd & Campbell*

ATTORNEYS 3,103,808
PORTABLE EQUIPMENT CHECK UNITS
Paul E. Eichelberger, 15 Mount Zion Road, York, Pa.
Filed Sept. 30, 1960, Ser. No. 59,658
5 Claims. (Cl. 73—39)

This invention relates to a portable check unit for the trailer components of over the road goods delivery vehicles of the type comprising a towing tractor and a trailer drawn by such tractor.

The function of the check unit is to provide means, operable in the absence of the tractor element, for testing the condition of the conventional lighting circuits and lights and also the condition and efficiency to the conventional air brake hoses, air pipe lines and the fluid pressure operated means which actuate the brakes of the trailers.

It is common practice for commercial establishments, manufacturing plants and the like to own a fleet of the trailer elements and possibly only two or three of the tractor elements, the loading of the trailers going forward during the absence of the tractors upon other deliveries.

Since the batteries which supply current for the lights of the trailers and also the air pressure fluid supply means for the control and operation of the air brakes of the trailers are mounted upon and are carried by the tractors, it follows that it is ordinarily impossible to test the condition of the lighting circuits and the brake lines of the trailers until a tractor element has been connected thereto. These tractor elements carry multiple conductor lighting cables, connectors upon the ends of which plug into corresponding receptacles upon the front end of the trailers and from which receptacles conventional electrical wires or conductors lead to the various lights of the trailers, such, for example as the tail lights, stop lights, turn signal lights, marker lights which delimit the width of the trailers for the drivers of approaching vehicles, etc. Also, the tractors carry air hose lines, usually in pairs, for conducting brake operating and controlling air pressures to the air brakes of the trailers. One of said air hoses constitutes the service brake air line and the other constitutes the emergency brake air line.

The device of my invention consists of a portable unit, preferably a small wheeled truck, which carries a battery or other source of electrical energy and an air supply means, such as an air tank, such unit being capable of being brought into operative position with respect to any one of a group of trailers and there serving to impose upon the lighting circuits and the air lines of the trailers the same forces which would be imposed thereon if the tractors were connected thereto.

The manner in which this is done and the manifold advantages flowing therefrom will be best understood after a consideration of the accompanying drawings in which like numerals designate corresponding parts in all of the figures and in which.

Figure 1:
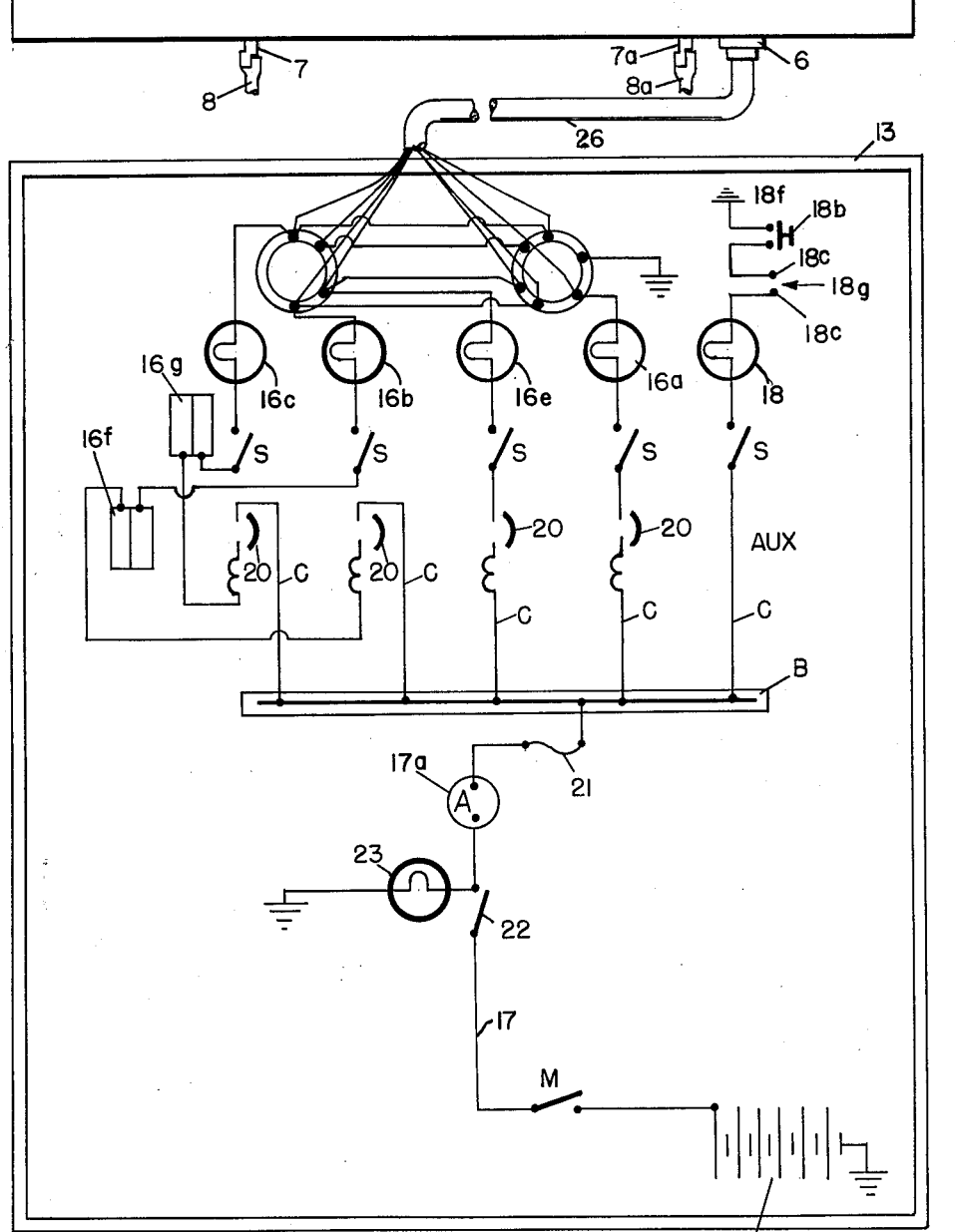
FIG. 1 is a diagrammatic view of the electrical connections between the battery of the test unit and the multiple conductor cable of the kind which normally conducts current from the tractor to the lighting circuits of the trailers.
Figure 2:
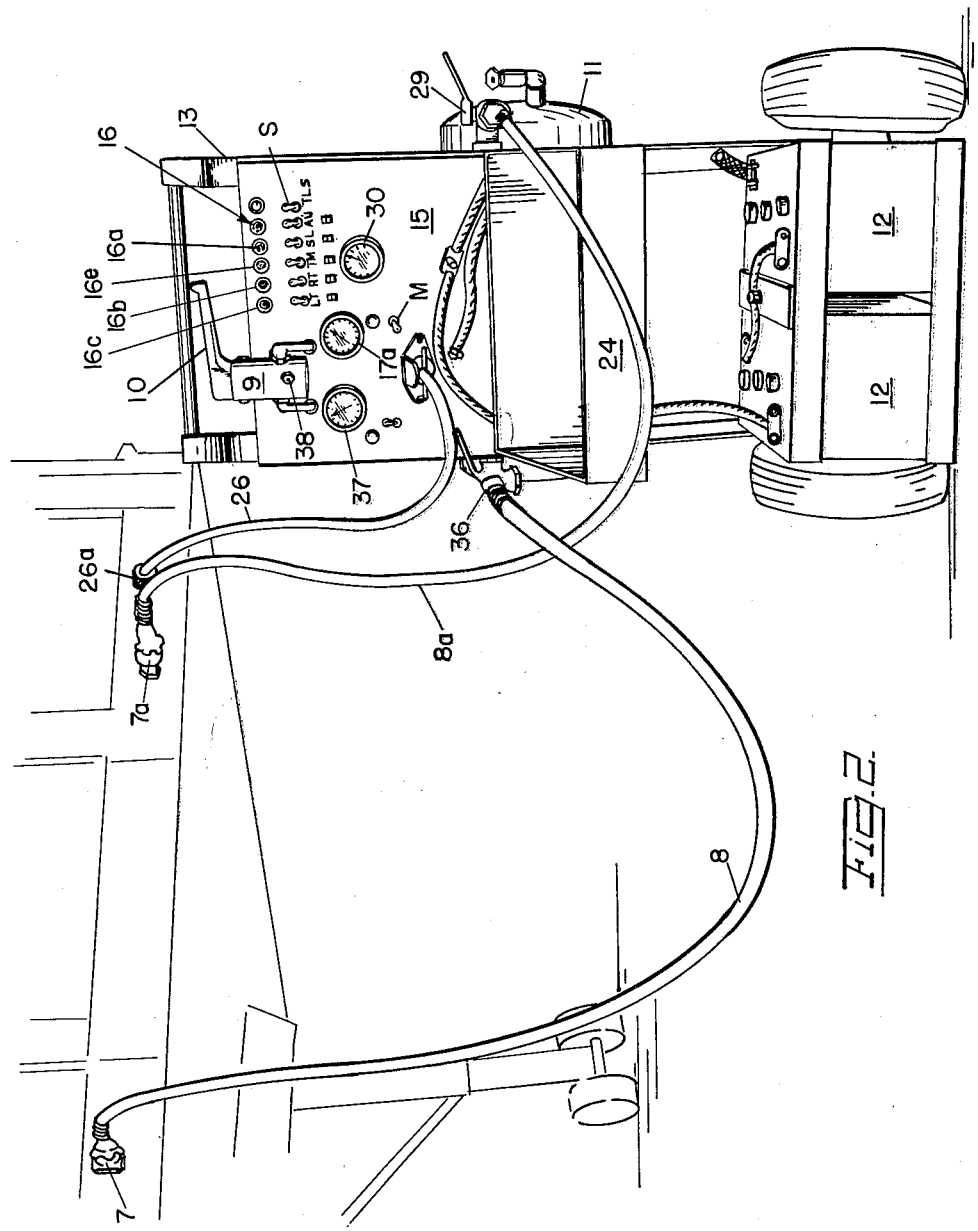
FIG. 2 is a view of a wheeled truck which carries a battery, an air tank and a panel upon which the test lights, air pressure gauges, ammeter, and manually operated air control valve are mounted.

In the drawings, 5 designates the front end portion of a conventional trailer which carries the electrical plug-in socket 6 and the air connections 7, 7a of the service and emergency air lines of the trailer. These connections 7, 7a comprise elements adapted to make air tight connection with the service and emergency air hose lines 8, 8a of the test unit and which service air hose line during testing or checking is controlled by a two-way valve 9, the manually operable handle of which is indicated at 10. During the testing operations air is supplied to the hose lines from an air tank 11 and electricity is supplied to the electrical circuits of the trailer from a battery 12, both the battery and the air tank being mounted upon and transported from trailer to trailer by a small wheeled truck 13, or other portable element. The devices mounted upon the portable truck include a panel 15 upon which a row of incandescent electric lights are mounted. These are lights which serve to indicate when the various lighting circuits of the trailer are in working order. These lights are included in the lighting circuits C of the trailer and these circuits (FIG. 1) include the stop light circuit and its test lamp 16a, right and left turn signal circuits with their test lamps 16b, 16c; marker and tail light signal circuit with its test lamp 16e and right and left turn flashers 16f, 16g.

The panel may also carry an auxiliary circuit for the attachment of a jumper cable to permit utilization of current from the battery 12 for any purpose. Such circuit and its test lamp is indicated at 18 in FIG. 1 and is also designated Aux. in said figure, and its switch is indicated 18b, upon the panel 15. This circuit is connected to bus bar B and is grounded at 18f. It includes a push button switch 18b in its length and also contact points 18c, into connection with which at 18g, a jumper extension cable may be plugged. If, for example a power tool were plugged in at 18g and switch 18b were closed, the lighting of light 18 would indicate the power tool to be electrically operative.

The several lighting circuits C also include circuit breakers 20 and the circuits C may be connected to a common bus bar B. Connections between the bus bar and a conductor 17, which leads from battery 12 through switch M, include a 60 ampere fuse 21, ammeter 17A, and switch 22. An indicating light 23 indicates the energization of the bus bar and the circuits C when switch 22 is closed. If, upon closing of switch 22 light 23 lights, the operator knows that there is current present in the battery 12, and action of the ammeter indicates the sufficiency of the strength of current being delivered to the group of lights served from the bus bar B.

When a tractor leaves a trailer, said tractor carries with it its multiple lead cable and two air brake hoses, leaving only the connections of the corresponding electrical and air pressure lines of the trailer exposed at the front end of the trailer. The truck 13 carries a pan-like body 24 within which the service test air hose 8, the emergency test air hose 8a and the multiple lead cable 26 of the test unit may be coiled in the transportation of the truck from trailer to trailer. The circuits C (FIG. 1) are brought into and form the multiple leads of test cable 26 which as before stated has upon its outer end a plug 26a adapted to be plugged into the corresponding multiple lead socket 6 from which the fixed lighting circuits of the trailers lead.

Figure 3:
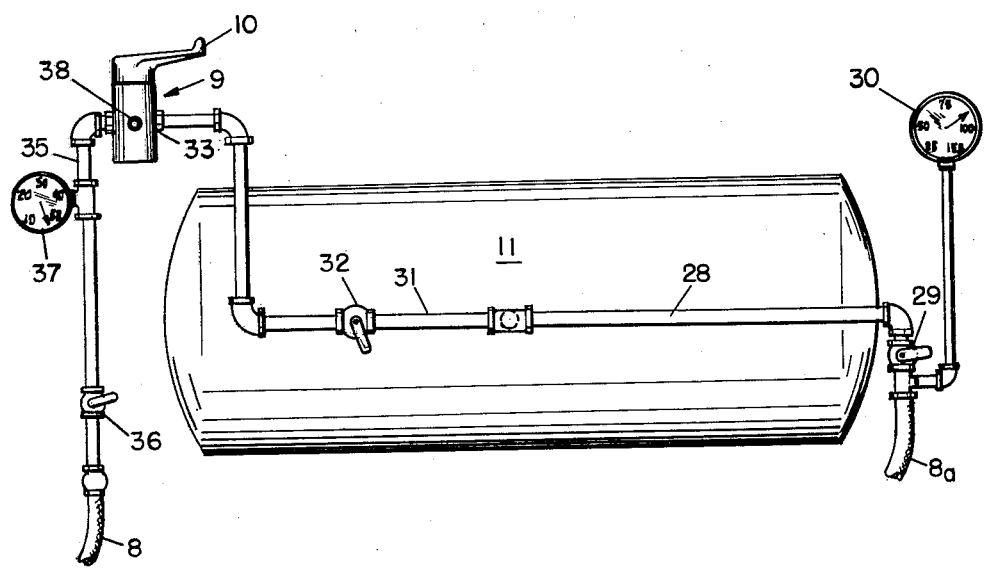
FIG. 3 is a diagrammatic view showing only the truck carried air tank, the manually operated air control valve of the service air line, fragments of the service and emergency air hoses and the connections between these elements.

In FIG. 3 it is shown that testing air is supplied from tank 11 through pipe 28 and shut off valve 29 to the emergency line test hose 8a. In testing the trailer air brakes hose 8a is connected to the trailer emergency line coupling 7a by opening valve 29. The operator not only notes and assures himself that the emergency brakes release when air is supplied to line 8a, and are again reset when air supply is cut off by the closing of valve 29 but he can also, by noting the reading upon high pressure air gauge 30, see how much pressure is required to release the brakes. This latter information also indicates to the operator or tester the brake setting pressure remaining in the local brake setting air supply tank of each individual trailer. A final check of the emergency brakes may be had by noting that the brakes set themselves to braking position when the hose 8a is removed from its engagement with connection 7a.

Figure 4:
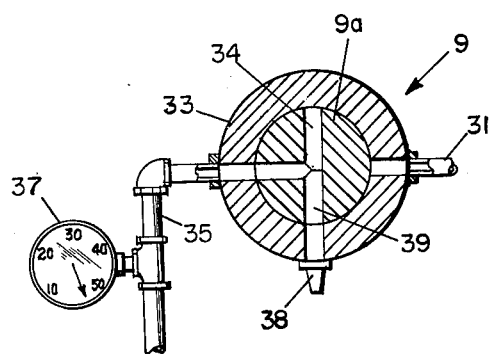
FIG. 4 is a diagrammatic sectional view showing the two way, manually controlled, service brake line valve.

The procedure in testing the service brake lines differs from the foregoing because the service brakes are, as stated, applied by air pressure and released when the air pressure is cut off. In order to avoid sluggish release of the service brakes it is customary to vent the service air line simultaneously with the cutting off of the air. Referring again to FIG. 3 it will be seen that a pipe 31 leads from the air tank through a shut off valve 32 to the casing 33 (FIGS. 3 and 4) of the valve 9. The valve element 9a in casing 33 has a port 34 extending therethrough which when the handle 10 is in one position, permits the passage of air to a branch pipe 35. This pipe leads through a stout shut off valve 36 to the service line test hose 8 and with handle 10 in testing position air passes through port 34 and service test hose 8 and this acts to apply the service brakes upon the trailer. A low pressure gauge 37 indicates the amount of pressure required to set the brakes and if the brakes do not respond under reasonable pressure the necessity for overhaul of the brakes is indicated.

By giving handle 10 a quarter turn, port 34 is moved out of line with the incoming branch of air supply pipe 31 and the outlet branch 35 is brought into communication with a vent port 38 through a port 39 of the valve. This is the position indicated in FIG. 4. This quickly gets rid of residual air in the line and insures a desirable quick response of the service brakes.

From the foregoing it will be seen that the test unit of this invention provides means whereby one man working alone on detached trailers can make a check of a battery of detached trailers which will yield information that under normal practice would require the services of two men, one in the tractor cab to manipulate the light switches and the other to go behind the trailers to observe the lights.

By the use of this device one tester can use the panel carried elements to test from one point of observation all of the trailer carried elements of brakes and lights. From this one point of observation he can apply testing pressures upon the hoses and note the results upon the air gauges. He can also individually test every electric circuit of the trailer for shorts as well as for full and complete lighting effects by observation of the test lights on the panel and by the action of the ammeter or voltammeter if desired.

This unit also has value in connection with the tractor itself in the following respects:

(a) It checks the lighting circuits for shorts;

(b) It determines the wiring sequence of the tractor to insure that tractor and trailer assemblies with different wiring sequences are not joined and operated with consequent electrical failure;

(c) It gives timely warning of the existence of different systems so that a jumper can be prepared in advance to enable the two to operate safely together; and (d) Acts as a power pack to start the engine when its own battery power is low.

It is to be understood that the invention is not limited to the particular constructions shown but that it includes within its purview whatever changes fairly fall within either the terms or the spirit of the appended claims.

I claim:

1. Apparatus for testing and checking the condition and operability of the service and emergency air lines of trailers of the type which in use are normally towed by separate tractor elements and at which time the service brakes are actuated by air pressure from the tractor and the emergency brakes are released by air from the tractor, and which emergency brakes are moved to braking position by air pressure from a trailer carried source of air when the tractor and trailer are disconnected from each other; said testing and checking apparatus comprising a portable trucklike body adapted to be brought into testing relation to a trailer, in the absence of its towing tractor, said portable body carrying a pressure air tank, an emergency air line including an air hose, connected to said air tank, a shut off valve between the tank and emergency air hose, an air pressure gauge connected to the emergency air line at a point to have the air pressure which is delivered to the emergency air line indicated upon said gauge, a manually operable two-way valve comprising a casing and manually operable valve element therein, said casing also having a vent leading therefrom, a service brake air line having a first branch leading from the air tank to the valve casing and having a shut off valve therein, a service line air hose and a second branch line leading from the casing of the two-way valve to the service line air hose, both of said hoses carrying at their free ends air hose connections of a nature to make air tight connection with the conventional service and emergency air line connections of the trailer under test, said two-way valve when in one position establishing communication between the said two branches and shutting off the vent and when in another position shutting off communication between the last named branch and the vent, an electric battery upon the truck, a plurality of electrical circuits connected to said battery, a multiple circuit electric cable having means for connecting its circuits to the electrical circuits of the trailer at the conventional plug-in connection of said trailer and having its circuits connected to the electrical circuits from said battery, said latter circuits including test lamps, circuit breakers and individual controlling switches and a panel upon the truck upon which the test lamps, and switches are mounted and at which said test lamps are visible.

2. Apparatus for testing and checking the group of several individual lighting circuits and lamps upon towed trailers, which trailers normally have no source of electricity upon them, said apparatus comprising a portable carrier, an electric battery upon said carrier, a multiple circuit electric cable having connecting means upon one end constructed for plug-in connection with the conventional plug-in connection of a towing vehicle by which the trailer is toward when in use, a plurality of individual testing electric circuits upon the carrier, individual test lamps and individual control switches for such individual circuits, a panel upon the carrier upon which said test lamps are all visible, and upon which the respective control switches are mounted, means for connecting the leads of the multiple circuit electric cable to the individual testing electric circuits upon the carrier and means for connecting the battery upon the carrier to all of said individual testing circuits.

3. A structure as recited in claim 2 wherein such latter connecting means consists of a bus bar to which all of the individual testing electric circuits are connected and a connecting circuit between said battery and the bus bar.

4. A structure as recited in claim 2 wherein such latter connecting means consists of a bus bar to which all of the individual testing electric circuits are connected and a connecting circuit between said battery and the bus bar having an ammeter therein the indications of which are common to all of the individual testing circuits.

5. A structure as recited in claim 2 in combination with an air pressure tank mounted upon the carrier, valved outlets having control handles leading from said tank, a pair of air hoses leading from said valved outlets having at their ends connecting elements constructed for connection to the air lines of a trailer that is disconnected from its towing vehicle, one of said hoses connecting to the emergency brake line of the trailer and the other of said hoses connecting to the service brake line of said trailer and a manually operable valve mounted upon the carrier which constitutes part of the service brake line, an operating handle for said valve, which when in one position admits air from the tank to the service brake line, and when in another position shuts off such air and vents the service brake line.

References Cited in the file of this patent

UNITED STATES PATENTS

| | | |
|---|---|---|
| 1,555,074 | Pogue | Sept. 29, 1925 |
| 2,310,974 | Lumm | Feb. 16, 1943 |
| 2,509,816 | Elson | May 30, 1950 |
| 2,800,980 | Flockhart | July 30, 1957 |

FOREIGN PATENTS

| | | |
|---|---|---|
| 135,920 | Great Britain | Dec. 2, 1919 |
| 485,563 | Canada | Aug. 12, 1952 |

OTHER REFERENCES

Allen Electric and Equipment Co. Form No. S225–6A 45M; received in Div. 36 Jan. 26, 1959.

Kahn and Co. (Catalog No. Kc–1037), received in Div. 36 July 21, 1958.

Nankervis Co. Bulletin No. 1373, received in Div. 36 Aug. 3, 1959.

Westinghouse Air Brake, Instruction Pamphlet No. 5039, Sup. 2, November 1959.

Heyer Industries, Bulletin No. NTE-71555, received in Div. 36 Jan. 26, 1959.